US012436203B2

(12) United States Patent
Hemmer et al.

(10) Patent No.: US 12,436,203 B2
(45) Date of Patent: Oct. 7, 2025

(54) ELECTRICAL CIRCUIT ARRANGEMENT AND METHOD FOR DETECTING A SHORT CIRCUIT

(71) Applicant: Schaeffler Technologies AG & Co. KG, Herzogenaurach (DE)

(72) Inventors: Joachim Hemmer, Scheßlitz (DE); Julian Breiter, Regensburg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 147 days.

(21) Appl. No.: 18/290,177

(22) PCT Filed: May 17, 2022

(86) PCT No.: PCT/DE2022/100366
§ 371 (c)(1),
(2) Date: Nov. 10, 2023

(87) PCT Pub. No.: WO2022/242796
PCT Pub. Date: Nov. 24, 2022

(65) Prior Publication Data
US 2024/0264242 A1    Aug. 8, 2024

(30) Foreign Application Priority Data
May 18, 2021    (DE) .................... 10 2021 112 808.0

(51) Int. Cl.
| G01R 31/52 | (2020.01) |
| B60L 3/00 | (2019.01) |
| G01R 19/00 | (2006.01) |
| G01R 31/58 | (2020.01) |

(52) U.S. Cl.
CPC ......... *G01R 31/52* (2020.01); *G01R 19/0038* (2013.01); *B60L 3/0069* (2013.01); *G01R 31/58* (2020.01)

(58) Field of Classification Search
CPC ........ G01R 31/00; G01R 31/40; G01R 31/42; G01R 31/50; G01R 31/52; G01R 31/58; G01R 19/00; G01R 19/0038; B60L 3/00; B60L 3/0023; B60L 3/0069; B60L 2240/00; B60L 2240/80
USPC .................................. 324/500, 509
See application file for complete search history.

(56) References Cited

U.S. PATENT DOCUMENTS

2017/0194101 A1    7/2017    Karunadasa

FOREIGN PATENT DOCUMENTS

| CN | 101180786 A | * | 5/2008 | .......... H05B 41/392 |
| DE | 2055980 B2 |  | 6/1979 | |
| DE | 4128961 C1 | * | 8/1992 | .......... H02H 7/1227 |
| DE | 102012019996 A1 | | 4/2014 | |
| DE | 102014018642 A1 | | 6/2016 | |

(Continued)

*Primary Examiner* — Hoai-An D. Nguyen

(57) ABSTRACT

The present disclosure relates to an electrical circuit arrangement comprising an inverter and a measuring device designed to identify a short circuit between a conductor and a shielding in a circuit, which is connected or connectable to the inverter. The shielding is connected capacitively to a ground of the inverter, and a pulsed voltage is generated on the conductor by the inverter. The measuring device is designed to evaluate a voltage between the ground of the inverter and the shielding and to generate a short circuit signal when at least one pulse of the voltage occurs.

20 Claims, 2 Drawing Sheets

(56) References Cited

FOREIGN PATENT DOCUMENTS

| | | | | | |
|---|---|---|---|---|---|
| DE | 102017005306 | A1 | | 11/2017 | |
| EP | 2720334 | A1 | | 4/2014 | |
| GB | 2065394 | A | * | 6/1981 | ............. H03H 3/382 |
| JP | 2018011479 | A | * | 1/2018 | ............. H02M 7/48 |
| KR | 20150019224 | A | * | 2/2015 | ............. H02H 7/122 |
| TW | 202326685 | A | * | 7/2023 | ............... G09G 3/32 |

* cited by examiner

ELECTRICAL CIRCUIT ARRANGEMENT AND METHOD FOR DETECTING A SHORT CIRCUIT

CROSS-REFERENCE TO RELATED APPLICATIONS

This application is the U.S. National Phase of PCT Appln. No. PCT/DE2022/100366 filed May 17, 2022, which claims priority to DE 102021112808.0 filed May 18, 2021, the entire disclosures of which are incorporated by reference herein.

TECHNICAL FIELD

The present disclosure relates to an electrical circuit arrangement comprising an inverter and a measuring device for identifying a short circuit between a conductor and a shielding in a circuit connected or connectable to the inverter, wherein the shielding is connected capacitively to a ground of the inverter and a pulsed voltage can be generated on the conductor by the inverter. The present disclosure further relates to a method for detecting a short circuit between a conductor and a shielding in a circuit connected to an electrical circuit arrangement, wherein the electrical circuit arrangement comprises an inverter and a measuring device for determining the short circuit.

BACKGROUND

Strict electromagnetic compatibility (EMC) requirements apply to electrical circuit arrangements in motor vehicles in order to prevent interference in other electrical circuit arrangements inside and outside the motor vehicle. In many cases, such electrical circuit arrangements comprise components such as electrical machines that are operated by an inverter. If there is a connection between a conductor with a shielding in the component or in a connector used to connect the component, then a short circuit occurs.

Such a short circuit can in particular lead to the shielding losing its shielding effect, i.e., preventing electromagnetic interference emissions, due to the electrical connection between the conductor and the shielding, so that the electromagnetic compatibility or the required limit values can no longer be complied with by the electrical circuit arrangement. This can occur, for example, with a conductor that carries a motor phase current, since when the short circuit occurs, the pulsed voltage of the motor phase is applied to the shielding and the shielding therefore significantly loses its shielding effect for the conductor.

In order to be able to react to the possibly reduced shielding of interference, it is desirable that the occurrence of such a short circuit can be determined or detected. Basically, it is known that a short circuit can be detected by measuring a short circuit current. However, particularly in electrical circuit arrangements used in motor vehicles, system architectures can exist in which, due to purely capacitive connections between individual potentials, no closed circuit for a direct current or a low-frequency alternating current is created between the conductor and the shielding in the event of a short circuit. In such a case, the short circuit will not lead to the formation of a significant short circuit current or to an increase in current on the conductor connected to the shielding via the short circuit. However, even in such a case, the shielding effect of the shielding can be lost, so it is desirable to be able to determine the occurrence of such a short circuit.

SUMMARY

The present disclosure, according to an exemplary embodiment, provides an electrical circuit arrangement which enables an improved determination of a short circuit between a conductor and a shielding in a circuit connected or connectable to the inverter, in particular in the event that the short circuit does not result in the occurrence of a significant short circuit current.

In an electrical circuit arrangement of the type mentioned at the outset, it is provided, according to the present disclosure, that the measuring device is designed to evaluate a voltage between the ground of the inverter and the shielding and to generate a short circuit signal when at least one pulse of the voltage occurs.

The pulsed voltage generated by the inverter on the conductor can, for example, move a current onto the conductor, which is supplied to the circuit connected or connectable to the inverter. This circuit can be, for example, an electrical machine or a circuit comprising an electrical machine. The electrical machine can be connected directly to the inverter and, for example, can be arranged as a common unit with the inverter in a housing. It is also possible for the circuit with the inverter to comprise a connecting means, for example a single- or multi-phase line or cable, via which the circuit is or can be connected to the inverter. In this case, the short circuit between the conductor and the shielding can occur in the connecting means or between the conductor or the conductor potential and the shielding or a shielding potential inside another component of the connected circuit or the connected electrical machine.

Due to the capacitive connection between the ground of the inverter and the shielding, a direct current or a low-frequency alternating current cannot flow back into an energy source via the inverter. If the electrical circuit arrangement is arranged in such a way that an energy source feeding the inverter is also capacitively connected to the shielding or capacitively decoupled from the shielding, no direct current or low-frequency alternating current can flow via such a path. The pulsed voltage that can be generated on the conductor by the inverter has, in particular, a comparatively low frequency, e.g., of 1 kHz or less, so that the current generated on the conductor cannot flow via the capacitive connections, as this represents a high impedance for the current.

Therefore, the occurrence of the short circuit between the conductor and the shielding is determined according to the present disclosure by measuring the voltage between the ground of the inverter and the shield. In the event that there is no short circuit, the voltage between the ground of the inverter and the shielding is not pulsed. If there is a short circuit between the conductor and the shielding, a pulsed voltage is also present on the shielding, so that a short circuit can be concluded by the occurrence of pulses or the pulsed voltage on the shielding or on a conductor connected to the shielding potential. The occurrence of the short circuit can therefore be detected without a short circuit current or an increased current on the conductor or the like having to occur for short circuit detection.

Advantageously, when the short circuit occurs between the conductor and the shielding, a short circuit signal describing the occurrence of the short circuit can be generated, on the basis of which, for example, a measure can be taken to take the short circuit into account. For example, in the presence of the short circuit signal or in the presence of a short circuit signal describing a short circuit that has occurred, the inverter and/or a circuit connected to the inverter can be switched off.

It can thus be avoided that the electrical circuit arrangement and/or the switches that can be connected or connected to it are in an operating state in which an increased emission of interference occurs due to a short circuit between the conductor and the shielding. Impairment of further electrical circuit arrangements in the vicinity of the electrical circuit arrangement due to an undetected short circuit can thus advantageously be avoided. In particular, when the electrical circuit arrangement is used in a motor vehicle, specifications for electromagnetic compatibility can be met even if a short circuit occurs and impairments due to increased interference emissions from other motor vehicle components and/or from other electronic circuits in the vicinity of the motor vehicle can be avoided.

According to the present disclosure, it can be provided that the measuring device is designed to generate the short circuit signal when several voltage pulses have occurred within a predetermined time. The detection of a short circuit and thus the generation of the short circuit signal only takes place if several pulses, i.e., the presence of a pulse sequence or a pulsed and/or periodically changing voltage, are detected. A single pulse, which is detected by the measuring device, does not cause a short circuit signal to be generated.

This has the advantage that individual pulses, which are used, for example, in a so-called electrostatic discharge (ESD) test, do not lead to the detection of a short circuit. Such ESD pulses can occur in particular in electrical circuit arrangements arranged in the motor vehicle, since an ESD test is a common test method for components installed in the motor vehicle or for complete motor vehicles. The measuring device is therefore able to distinguish whether individual, non-repeating voltage pulses occur which are not caused by a short circuit and are, for example, the result of an ESD test, or whether several pulses of the voltage are measured and consequently, in all probability, a short circuit has occurred. The predetermined time within which the multiple pulses can occur can be selected depending on a frequency of the pulsed voltage generated by the inverter and, for example, relate to a time range between 1 ms and 1 s, so that two subsequent ESD tests also do not result in a short circuit detection.

In embodiments of the present disclosure, it can be provided that the measuring device comprises a comparator, wherein the voltage between the ground of the inverter and the shielding is present at a first input of the comparator, and a reference voltage is present at a second input of the comparator, wherein the measuring device is designed to generate the short circuit signal from an output signal of the comparator.

The voltage that is present between the ground of the inverter and the shielding can, for example, drop across at least one capacitor, which is connected between a ground connection of the inverter and a connection at the potential of the shielding and thus causes the capacitive connection or decoupling between the shielding and the ground of the inverter. The capacitor can be present as a populated component, in particular on a circuit board carrying the electrical circuit arrangement. In addition to the at least one capacitor, the capacitive connection can also comprise one or more resistive elements.

Depending on the level of voltage that can be expected to be present in the event of a short circuit across this capacitor or between the ground of the inverter and the shielding, the voltage can be applied directly to the input of the comparator or a voltage divider can be used to reduce the voltage, in particular if the expected voltages are above a permissible input voltage for the comparator. The use of a comparator, which compares the voltage present at a first input with the reference voltage, advantageously makes it possible to compensate for fluctuations and/or a level of the voltage present at the first input that cannot be precisely predicted, and to always generate the same output signal from the comparator, regardless of an actual value, i.e., a logical 0) or 1. Voltages in a predetermined range that can occur in the event of a short circuit can therefore advantageously be evaluated, wherein the same output signal from the comparator is always generated regardless of the actual level. When generating the short circuit signal from the output signal of the comparator, a uniform output signal can be used, which occurs when the voltage present at the first input is above the reference voltage of the comparator. The reference voltage can be generated, for example, in a separate circuit of the measuring device. If there is no galvanic connection between a ground of the inverter and a separate ground of the measuring device, an insulating comparator or a comparator with a downstream isolator can be used, for example.

According to the present disclosure, it can further be provided that the measuring device comprises a re-triggerable monostable flip-flop, wherein the holding time of the flip-flop is greater than the period of the pulsed voltage generated by the inverter and the output signal of the comparator is present at the input of the flip-flop, and the measuring device is designed to generate the short circuit signal when the output signal of the flip-flop has a constant switching state for a predetermined period of time. A re-triggerable monostable flip-flop, also referred to as a re-triggerable monoflop, changes its switching state from a first switching state or output state to a second switching state or active state for a certain time by means of a trigger signal applied to the input of the flip-flop. The flip-flop then returns to the initial state after the hold time has elapsed, wherein a re-triggerable flip-flop is restarted by a new trigger signal received during the hold time until the flip-flop returns to the initial state and the flip-flop remains in the active state. A new trigger signal received during the active, triggered state thus extends the active time state in time.

The holding time of the monostable flip-flop may be greater than the maximum period of the pulsed voltage generated by the inverter if the inverter can generate different frequencies, for example in order to set different speeds in an electric motor connected to the inverter. The holding time can, for example, be twice as long as the period or a maximum period of the voltage that can be generated by the inverter. If there is now a short circuit, an output signal that is permanently at a logical value is generated at the output of the monostable flip-flop, since the re-triggerable flip-flop is always triggered again by the pulses of the voltage between the ground of the inverter and the shielding or the pulses of the output voltage that arrive during the hold time of the comparator.

The short circuit signal can be generated when the output signal of the monostable flip-flop is at the logical voltage level corresponding to the active switching state for a predetermined period of time, which corresponds in particular to several pulses of the voltage generated by the inverter. In this way, a simple structure of the measuring device can be implemented with analog elements, which only generates a short circuit signal when several pulses occur. In particular in connection with the comparator, a tolerance to voltage fluctuations in the event of a short circuit can therefore also be generated, so that a diagnosis of a short circuit that has occurred can be carried out reliably and quickly.

According to the present disclosure, it can be provided that the electrical circuit arrangement comprises a control device, wherein the short circuit signal can be determined by the control device or can be transmitted from the measuring device to the control device, wherein the control device is designed to initiate at least one measure when the short circuit signal is present.

The control device can therefore be part of the measuring device or it can be an additional control device of the electrical circuit arrangement. If it is part of the measuring device, then the control device can generate the short circuit signal from an output signal of the measuring device, in particular from the output signal of the flip-flop. This can be done, for example, if the output signal of the flip-flop corresponds to the active switching state of the flip-flop for a predetermined period of time. The predetermined period of time can in particular correspond to a multiple of the holding period of the flip-flop and, for example, comprise at least ten period durations of the pulsed voltage generated by the inverter. Alternatively, it is possible for the short circuit signal to be generated by a further component of the measuring device from the output signal of the flip-flop and/or the comparator, wherein the short circuit signal generated by the measuring device is transmitted to the control device, for example in the form of a one-bit signal or a voltage corresponding to a predetermined value.

In addition to identifying or receiving the short circuit signal, the control device can also contain other functions: in particular, it can also control or regulate the inverter. For this purpose, the control device can be connectable or connected to at least one data communication interface, via which corresponding information or commands for operating the inverter can be received and/or sent. If a short circuit signal is present, the control device can initiate a measure that takes the short circuit that has occurred into account. In particular, the inverter can be switched off and/or short circuit information describing the presence of a short circuit can be transmitted via a data interface connected to the control device.

In embodiments of the present disclosure, it can be provided that the electrical circuit arrangement comprises a ground contact and/or a housing, wherein the ground contact and/or the housing are at the potential of the shielding and the ground of the inverter is capacitively coupled to the ground contact and/or the housing. The ground contact can be designed, for example, as a base plate made of a metal, as a layer in the structure of a circuit board, in particular a printed circuit board (PCB), of the electrical circuit arrangement.

The ground potential of the electrical circuit arrangement can additionally or alternatively also be applied to a housing, in particular a metal housing, of the electrical circuit. The potential of the shielding is applied to the ground contact and/or to the housing. This can be done, for example, via an electrical connection between the ground contact and the shielding, in particular via a contact pin provided for this purpose. A connection to a housing of the electrical circuit arrangement can also be made, for example via an electrical pin on the housing, which can be connected or is connected to the shielding of the circuit.

According to the present disclosure, it can be provided that the inverter is connected or can be connected to an energy store, wherein the energy store is capacitively coupled to the shielding. The energy store can be, for example, a low-voltage energy store, in particular a low-voltage battery, which provides a voltage of, for example, 12 volts, 24 volts or 48 volts. Alternatively, it is possible that the energy store is a high-voltage energy store, in particular a high-voltage battery, which provides a voltage between 400 volts and 800 volts. The capacitive coupling of the energy store to the shielding can occur directly or indirectly. An indirect capacitive coupling can exist, for example, if the energy store and the shielding are each capacitively coupled to another potential, for example the chassis of a motor vehicle.

In the case of electrical circuit arrangements that are used in a motor vehicle, the low-voltage energy store can be, for example, a battery intended to supply a low-voltage vehicle electrical system. A high-voltage energy store can accordingly be a traction energy store, which operates a high-voltage on-board electrical system of the motor vehicle and can, for example, power a traction electrical machine as a circuit connected to the inverter via the inverter of the electrical circuit arrangement. The energy store connected to the inverter is in particular also capacitively coupled to the shielding or to a chassis coupled to the shielding, so that in the event of a short circuit, no short circuit current can flow into the energy store via the conductor and the shielding.

In embodiments of the present disclosure, it can be provided that the electrical circuit arrangement has a circuit connected to the inverter, wherein the circuit comprises at least one electrical machine. The inverter of the electrical circuit arrangement can in particular be designed as a three-phase inverter, for example as a B6 bridge comprising three half-bridges or as a pulse inverter.

The electrical circuit arrangement can be a roll stabilizer, an electric steering system and/or an electric traction drive for a motor vehicle. Many other systems with this architecture are also conceivable, so that the electrical circuit arrangement can also be used for other purposes. The electric steering system can be, for example, front-axle steering or rear-axle steering. The electrical machine of the circuit connected to the inverter can therefore be, for example, an electric traction machine for a motor vehicle. It is also possible for the electrical machine of the circuit to be part of a motor vehicle actuator other than a traction drive, which is controlled or operated via the electrical circuit arrangement.

For a method according to the present disclosure for detecting a short circuit between a conductor and a shielding in a circuit connected to an electrical circuit arrangement, wherein the electrical circuit arrangement comprises an inverter and the shielding is capacitively connected to a ground of the inverter, wherein a pulsed voltage is generated on the conductor by the inverter: it is provided that a voltage between the ground of the inverter and the shielding is evaluated and when at least one pulse of the voltage occurs, a short circuit signal is generated.

The short circuit signal can be generated if several voltage pulses have occurred within a predetermined time.

The electrical circuit arrangement can comprise a measuring device which evaluates the voltage between the ground of the inverter and the shielding and generates a short circuit signal when at least one pulse of the voltage occurs. The measuring device can comprise a comparator, wherein the voltage between the ground of the inverter and the shielding is present at a first input of the comparator and a reference voltage is present at a second input of the comparator, wherein the short circuit signal is generated by the measuring device from an output signal of the comparator.

The measuring device can comprise a re-triggerable monostable flip-flop, wherein the holding time of the flip-flop is greater than the period of the pulsed voltage generated by the inverter and the output signal of the comparator is present at the input of the flip-flop and the short circuit signal is generated by the measuring device when the output signal of the flip-flop has a constant switching state for a predetermined period of time.

The electrical circuit arrangement can comprise a control device, wherein the short circuit signal is identified by the control device or transmitted to the control device by the measuring device, wherein the control device initiates at least one measure if the short circuit is present.

All the advantages and configurations described above in relation to the electrical circuit arrangement according to the present disclosure apply correspondingly to the method according to the invention and vice versa.

BRIEF DESCRIPTION OF THE DRAWINGS

The present disclosure is explained below on the basis of exemplary embodiments with reference to the drawings. The drawings are schematic representations, wherein.

DETAILED DESCRIPTION

Figure 1:
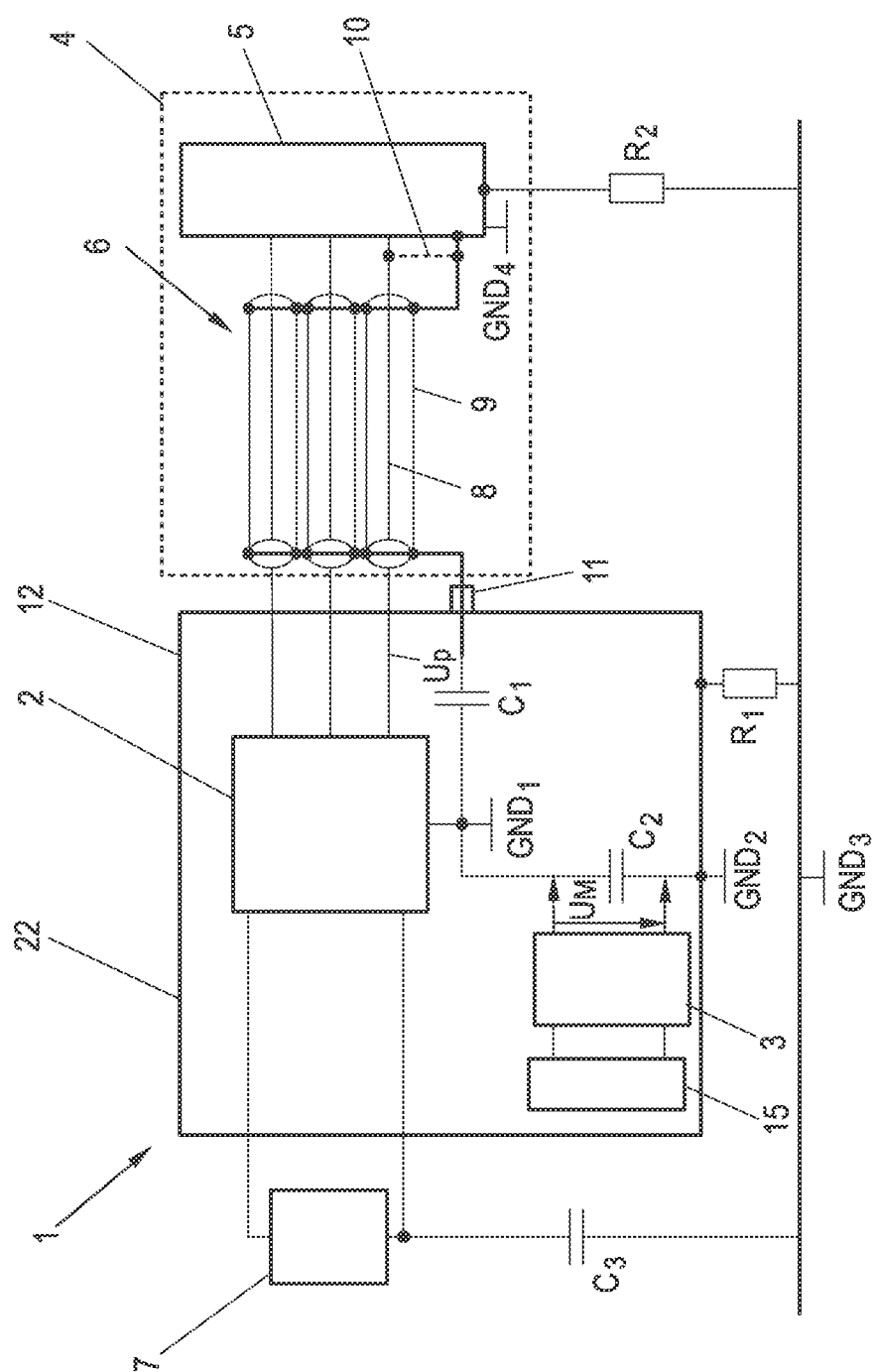
FIG. 1 shows an exemplary embodiment of an electrical circuit arrangement according to the present disclosure.

FIG. 1 shows an exemplary embodiment of an electrical circuit arrangement 1. The electrical circuit arrangement comprises an inverter 2 and a measuring device 3 for determining a short circuit in a circuit 4 connected or connectable to the inverter 2. In the present example, the circuit 4 connected to the inverter 2 comprises an electrical machine 5 and a connecting means 6, which in the present case is designed as a three-phase, shielded motor cable. Via the connecting means 6, a three-phase alternating current in the present exemplary embodiment can be transmitted from the inverter 2 to the electrical machine 5, so that motor operation of the electrical machine 5 via the inverter 2 is possible. To provide this alternating current, the inverter 2 is connected to an energy store 7. The inverter 2 can be designed as a B6 bridge, for example.

The measuring device 3 is designed to determine a short circuit between a conductor 8 and a shielding 9 of the circuit 4. This short circuit is shown schematically as a dashed connection 10 between the conductor 8 and the shielding 9. The short circuit can occur in the connecting means 6 or within the electrical machine 5.

The conductor 8 is connected to an AC side of the inverter 2. In the present case, the shielding 9 is capacitively connected to a ground potential $GND_1$ of the inverter 2 via a capacitance $C_1$. The shielding 9 is connected via a contact pin 11 to a housing 12 of the electrical circuit arrangement 1, wherein the housing 12 is a metal housing and represents a ground potential $GND_1$ of the electrical circuit arrangement 1. A capacitance $C_2$ is arranged between the ground potential $GND_1$ of the inverter 2 and the ground potential $GND_2$ of the housing 12, so that the ground $GND_1$ of the inverter is also capacitively coupled to the shielding 9 connected to the housing 12 via the capacitance $C_2$.

In addition to the capacitances $C_1$ and $C_2$, the connection between $GND_1$ and $GND_2$ can also comprise one or more resistive elements. The capacitances $C_1$ and $C_2$ and any resistive elements present can, for example, be designed as fitted capacitors or resistors on a printed circuit board on which the electrical circuit arrangement 1 is fully or partially formed.

The electrical circuit arrangement 1 is shown in an installation situation in a motor vehicle, wherein the connections of the components to a ground potential $GND_3$ of the motor vehicle, for example a ground of a chassis of the motor vehicle, are also shown. The housing 12 is resistively connected to the ground $GND_3$ via a resistor $R_1$. A ground potential $GND_4$ of the electrical machine 5 of the circuit 4 is also resistively coupled to the ground $GND_3$ via a resistor $R_2$. The energy store 7 is also capacitively coupled to the ground $GND_3$ via a capacitance $C_3$. When the short circuit 10 occurs between the conductor 8 and the shielding 9, every possible short circuit current path runs over at least one of the capacitive connections formed by the capacitances C1, C2 and C3. In this way, a direct current or a low-frequency alternating current cannot flow as a short circuit current, since the capacitive connections for such a current each represent an infinite or at least a very high impedance.

The inverter 2 generates a pulsed, in this case three-phase, voltage, for example at a switching frequency between 1 kHz and 500 kHz, in particular between 10 kHz and 20 kHz, on the conductors 8 of the circuit 4. This voltage causes a current on the conductors 8 of the circuit 4, the frequency of which is, for example, between 1 Hz and 10 KHz, in particular between 1 Hz and 1 kHz. If a short circuit occurs between the conductor 8 and the shielding 9, the voltage $U_p$ of one of the phases, which is pulsed with the switching frequency of the inverter, is also present on the shielding 9, wherein the frequency of the voltage $U_p$ is significantly higher in frequency than the frequency, also known as the motor current fundamental frequency, of the current fed into the electrical machine 5.

Due to the voltage $U_p$ applied to the shielding 9, it loses its shielding effect. This can result in impaired electromagnetic compatibility (EMC) of the circuit 4, which is why the measuring device 3 is designed to detect such a short circuit. Since the measurement of a short circuit is not possible via a short circuit current or via a measurement of the phase currents flowing on the conductors 8 to power the electrical machine 5, a voltage $U_M$ between the ground $GND_1$ of the inverter 2 and the shielding 9 is evaluated by the measuring device 3. The voltage $U_M$ corresponds to the switching frequency of the inverter 2 and is significantly higher in frequency than the motor current frequency. The measuring device 3 is also configured to generate a short circuit signal when at least one pulse of this voltage occurs.

The housing 12 of the electrical circuit arrangement 11 can be designed as a metal housing which is connected to the ground potential $GND_2$. Alternatively, it is also possible to design the ground contact of the ground potential $GND_2$ as a conductive metal plate and/or as a layer of a circuit board, for example a printed circuit board, of the electrical circuit arrangement 1.

Figure 2:
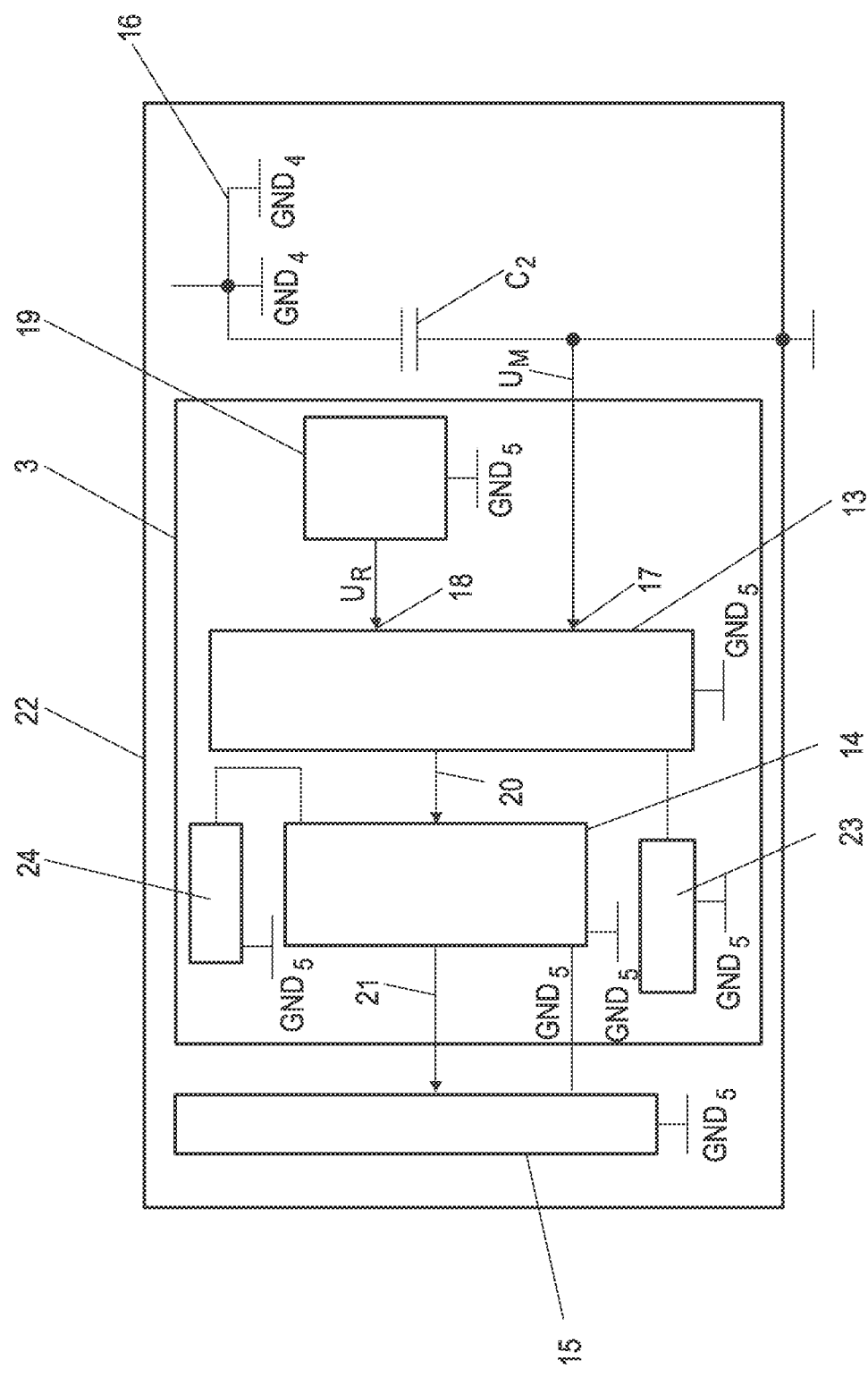
FIG. 2 shows a detailed view of the measuring device of the electrical circuit arrangement according to the present disclosure.

The structure of the measuring device 3 is shown schematically in FIG. 2. The measuring device 3 comprises a comparator 13 and a flip-flop 14. Furthermore, the measuring device 3 comprises a control device 15, which is designed, for example, as a microcontroller. Alternatively, the measuring device 3 is connected to a control device 15 of the electrical circuit arrangement 1, as will be explained in more detail below. The ground potential of the control device 15 is designated as $GND_5$ in FIG. 2. The ground potential $GND_5$ of the control device 15 can be galvanically connected to the ground potential $GND_1$ of the inverter 2. For this purpose, for example, a galvanic connection 16 in the form of a conductor track can be present on a circuit board of the electrical circuit device 1. Alternatively, another type of galvanic connection 16 can also be made, for example a connecting metallization between the equipotential surfaces of one or more circuit boards of the electrical circuit arrangement 1 assigned to the ground potentials $GND_1$ and $GND_5$. If there is no galvanic connection between the ground potential $GND_1$ of the inverter 2 and the ground potential $GND_5$, the comparator 13 can also be designed as an insulating comparator or as a comparator with a downstream isolator.

The voltage $U_M$ between the ground $GND_1$ of the inverter 2 or the ground $GND_5$ of the control device 15 connected thereto and the shielding or the ground potential $GND_2$ of the electrical circuit arrangement 1 is present at a first input 17 of the comparator 13. A reference voltage source 19 is connected to a second input 18 of the comparator, so that the voltage present at the first connection 17 is compared with the reference voltage $U_R$ present at the second connection 18. For example, the first connection 17 can be a negative connection of the comparator and the second connection 18 can be a positive connection of the comparator. A reverse assignment is also possible. Depending on the level of voltages that can occur between the shielding 9 and the ground $GND_1$ of the inverter 2, the measuring device 3 can comprise a voltage divider, so that the voltages $U_M$ can be reduced to a voltage level that matches the input 18 of the comparator 13.

The output 20 of the comparator 13 is connected to the flip-flop 14. The flip-flop 14 is designed as a re-triggerable monostable flip-flop, also referred to as a re-triggerable monoflop, and can, for example, be in the form of an integrated circuit (IC). The holding time of the flip-flop 14 is longer than the period of the pulsed voltage $U_p$ produced by the inverter 2, which is applied to the conductor 8 or, in the case of a short circuit, also to the shielding 9. The holding time can, for example, be at least twice as long as the period duration or as a maximum period duration that can be generated by the inverter 2 when the circuit 4 or the electrical machine 5 is operating.

The use of the comparator 13 makes it possible for a similar output signal corresponding to a logical level to be generated at the output 20 of the comparator 13 even with different voltages between the ground $GND_1$ of the inverter 2 and the shielding 9 when the measured voltage $U_M$ exceeds the reference voltage $U_R$. In this way, the measuring device 3 can be designed to be robust and for different high voltages $U_M$ that occur. This improves the reliability of the measuring device 3 or the electrical circuit arrangement 1 when detecting the short circuit.

The use of the monostable flip-flop 14 makes it possible to design the measuring device 3 in such a way that it generates the short circuit signal when several pulses of the measured voltage $U_M$ have occurred within a predetermined time. If the flip-flop 14 is designed as a re-triggerable monostable flip-flop and the holding time of an activated state of the flip-flop 14 is greater than the period of the pulsed voltage $U_p$ generated by the inverter 2, when a short circuit occurs, the holding time of the flip-flop 14 is continuously retriggered, so that an output 21 of the flip-flop 14 gives a constant signal level.

If this is present for a predetermined time, which is in particular greater than one or more periods of the pulsed voltage generated by the inverter 2, a short circuit can be concluded. The output 21 of the flip-flop 14 can be connected to the control device 15, wherein the control device 15 carries out the corresponding evaluation of the output 21.

This means that the control device 15 monitors whether there is an active switching state of the flip-flop 14 for the specified time. Alternatively, another type of evaluation can also be carried out, for example through a further, in particular analog, component of the measuring device 3. In this case, the control device cannot represent a component of the measuring device, wherein the short circuit signal generated by the measuring device 3 is transmitted to the control device 15.

Both cases have the advantage that the short circuit signal is present in analog form or is identified based on the duration of an analog signal at the output 21 of the flip-flop 14, so that the short circuit signal can be used quickly and without digitization delay to initiate measures due to the short circuit. For example, it is possible for the short circuit signal to be transmitted to the electrical machine 5 or another component of the circuit 4 so that their operation is stopped. Another type of use in the circuit 4 is also possible, in particular if the circuit 4 has a different structure than that shown. Furthermore, it is possible for the control device 15 to be connected to a communication connection, so that the short circuit information and/or information about measures to be carried out due to the short circuit can also be transmitted to other components of a motor vehicle.

The electrical circuit arrangement 1 can be designed, for example, as a roll stabilizer, an electric steering system and/or as an electric traction drive for a motor vehicle. It is possible that the circuit 4 represents part of the circuit arrangement 1, in particular that the electrical machine 5 is connected directly to the inverter 2 and no connecting means 6 is used. Even in such a case, a short circuit between a conductor 8 or a line potential and a shielding 9 or a shielding potential inside the motor 5 can be detected. As shown in FIG. 2, the measuring device 3 and the control device 15 can be designed as a control unit 22 connected to the inverter 2. The control unit 22 can also have a device 23 for generating a supply voltage for the comparator 13 and a device 24 for generating a supply voltage for the flip-flop 24. It is possible that the inverter 2 is also designed as part of the control unit 22, as shown in FIG. 1.

The energy store 7 can be designed as a low-voltage energy store, for example as a low-voltage battery, and have a voltage level of 12 volts, 24 volts or 48 volts. This is in particular possible if the electrical circuit arrangement 1 is designed as a roll stabilizer or an electrical steering system. In a circuit arrangement 1 designed as an electric traction drive for a motor vehicle, the energy store 7 can be designed as a high-voltage energy store, in particular a high-voltage battery, and can provide a voltage between 700 volts and 800 volts. Depending on the design of the electrical circuit arrangement 1, the circuit 4, in particular the size and/or the power to be implemented of the electrical machine 5, can also be selected differently. It is also possible to use the electrical circuit arrangement 1 for other purposes in addition to those mentioned above.

In an exemplary embodiment of the method according to the present disclosure, the measuring device 3 evaluates the voltage $U_M$ between the ground $GND_1$ of the inverter 2 and the shielding 9 and when several pulses of the voltage $U_M$ occur, i.e., when a pulsed voltage $U_M$ occurs on the shielding 9 in relation to the ground $GND_1$ of the inverter 2, a short circuit signal is generated. For this purpose, the voltage $U_M$ at the first input 17 of the comparator 13 is compared with the reference voltage $U_R$ at the second input 18 of the comparator 13. If the reference voltage $U_R$ is exceeded, an output signal at a logical one, for example, is generated at the output 20. This triggers the flip-flop 14 so that it also generates a logical one at its output 21, for example.

Since the holding time of the flip-flop 14 is greater than the period of the pulsed voltage $U_p$ of the inverter 2 and thus also the pulsed voltage $U_M$ between the ground $GND_1$ of the inverter 2 and the shielding 9 in the event of a short circuit, a continuous retriggering of the flip-flop 14 is achieved. For example, a logical one is permanently present at the output 20 of the flip-flop, wherein the short circuit signal is generated by the control device 15 if this logical one is present for a period of time that is greater than the holding time of the flip-flop 14. The holding period of the flip-flop 14 can, for example, correspond to twice the period of $U_p$ and the time period for which the control device 15 evaluates the signal at the output 21 of the flip-flop 14 can be a multiple, for example ten times, of the period of the voltage $U_p$ and therefore also exceed the holding time of the flip-flop.

If you choose a shorter holding time for the flip-flop and a shorter period of time for which the control device 15 evaluates the signal at the output 21 of the flip-flop 14, it is also possible that a single pulse of the voltage $U_M$ leads to the generation of a short circuit signal describing a short circuit that has occurred. This can be done, for example, if the short circuit detection is not required to be robust for an ESD test.

The control device 15 can then take a measure to counteract the short circuit that has occurred. For example, the control device 15 can also be designed to control or regulate the inverter 2 and switch off the inverter 2. Additionally or alternatively, the control device 15 can transmit corresponding short circuit information via a data interface (not shown here), so that, for example, when the electrical circuit 1 is arranged in a motor vehicle, a corresponding measure can also be taken by other components of the motor vehicle.

The use of the flip-flop 14 and the detection of several pulses in the voltage $U_M$ has the advantage that a single pulse, which can occur, for example, as part of an ESD test, is not detected as a short circuit between the conductor 8 and the shielding 9. Only several pulses within a predetermined time, which can be between 1 ms and 1 s, for example, are interpreted by the measuring device 3 as a short circuit. This ensures that no short circuit is detected during an ESD test of a motor vehicle that comprises the electrical circuit arrangement 1.

1 Circuit arrangement
2 Inverter
3 Measuring device
4 Circuit
5 Motor
6 Connecting means
7 Energy store
8 Conductor
9 Shielding
10 Connection
11 Contact pin
12 Housing
13 Comparator
14 Flip-flop
15 Control device
16 Connection
17 First input
18 Second input
19 Reference voltage source
20 Output
21 Output
22 Control unit
23 Device
24 Device

The invention claimed is:

1. An electrical circuit arrangement, comprising:
an inverter and a measuring device designed to identify a short circuit between a conductor and a shielding in a circuit, which is connected or connectable to the inverter, wherein the shielding is connected capacitively to a ground of the inverter, and a pulsed voltage is generated on the conductor by the inverter, wherein the measuring device is designed to evaluate a voltage between the ground of the inverter and the shielding and to generate a short circuit signal when at least one pulse of the voltage occurs.

2. The electrical circuit arrangement according to claim 1, wherein the measuring device is designed to generate the short circuit signal when several pulses of the voltage have occurred within a predetermined time.

3. The electrical circuit arrangement according to claim 1, wherein the measuring device comprises a comparator, the voltage between the ground of the inverter and the shielding is present at a first input of the comparator, and a reference voltage is present at a second input of the comparator, wherein the measuring device is designed to generate the short circuit signal from an output signal of the comparator.

4. The electrical circuit arrangement according to claim 3, wherein the measuring device comprises a re-triggerable monostable flip-flop, wherein a holding time of the flip-flop is greater than a period of the pulsed voltage generated by the inverter, and the output signal of the comparator is present at the input of the flip-flop, wherein the measuring device is designed to generate the short circuit signal when the output signal of the flip-flop has a constant switching state for a predetermined period of time.

5. The electrical circuit arrangement according to claim 1, further comprising a control device, wherein the short circuit signal can be determined by the control device or can be transmitted from the measuring device to the control device, wherein the control device is designed to initiate at least one measure when the short circuit signal is present.

6. The electrical circuit arrangement according to claim 1, further comprising at least one of a ground contact and a housing, wherein the at least one of ground contact and the housing are at a potential of the shielding, and the ground of the inverter is capacitively coupled to the at least one of the ground contact and the housing.

7. The electrical circuit arrangement according to at claim 1, wherein the inverter is connected or connectable to an energy store, wherein the energy store is capacitively coupled to the shielding.

8. The electrical circuit arrangement according to claim 1, wherein the circuit comprises at least one electrical machine.

9. The electrical circuit arrangement according to claim 8, wherein the electrical circuit arrangement is at least one of a roll stabilizer, an electric steering system and an electric traction drive for a motor vehicle.

10. The electrical circuit arrangement according to claim 1, wherein the short circuit signal is generated in analog form.

11. A method for detecting a short circuit between a conductor and a shielding in a circuit connected to an electrical circuit arrangement, wherein the electrical circuit arrangement comprises an inverter and the shielding is capacitively connected to a ground of the inverter, wherein a pulsed voltage is generated on the conductor by the inverter, the method comprising:
evaluating a voltage between the ground of the inverter and the shielding; and when at least one pulse of the voltage occurs, generating a short circuit signal.

12. The method according to claim 11, wherein, evaluating the voltage includes comparing the voltage between the ground of the inverter and the shield to a reference voltage.

13. The method according to claim 11, further comprising generating the short circuit signal when an output signal of a re-triggerable monostable flip-flop has a constant switching state for a period of time, wherein a holding time of the flip-flop is greater than a period of the pulsed voltage.

14. The method according to claim 11, further comprising, via a control device arranged in the electrical circuit arrangement, initiating at least when the short circuit signal is generated.

15. The method according to claim 11, wherein the electrical circuit arrangement includes at least one of a ground contact and a housing, wherein the at least one of the ground contact and the housing are at a potential of the shielding, and the ground of the inverter is capacitively coupled to the at least one of the ground contact and the housing.

16. The method according to claim 11, wherein the inverter is connected or connectable to an energy store, wherein the energy store is capacitively coupled to the shielding.

17. The method according to claim 11, wherein the circuit comprises at least one electrical machine.

18. The method according to claim 17, wherein the electrical circuit arrangement is at least one of a roll stabilizer, an electric steering system and an electric traction drive for a motor vehicle.

19. The method according to claim 11, wherein the short circuit signal is generated in analog form.

20. The method according to claim 11, further comprising generating the short circuit signal when several pulses of the voltage have occurred within a predetermined time.

* * * * *